United States Patent
Snead et al.

(12) 
(10) Patent No.: US 9,387,549 B2
(45) Date of Patent: Jul. 12, 2016

(54) ADJUSTABLE CLAMPING MECHANISM OF A WELD HEAD WITH QUICK RELEASE INSERT

(75) Inventors: Jamil Snead, San Diego, CA (US); Victor Miller, Jamul, CA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1069 days.

(21) Appl. No.: 13/474,947

(22) Filed: May 18, 2012

(65) Prior Publication Data

US 2013/0306612 A1 Nov. 21, 2013

(51) Int. Cl.
*B23K 9/028* (2006.01)
*B23K 37/04* (2006.01)
*B23K 37/053* (2006.01)

(52) U.S. Cl.
CPC ........... *B23K 9/0286* (2013.01); *B23K 37/0435* (2013.01); *B23K 37/0533* (2013.01)

(58) Field of Classification Search
CPC ........... B25B 5/06; B25B 5/068; B25B 5/163
See application file for complete search history.

(56) References Cited

U.S. PATENT DOCUMENTS 4,216,365 A    8/1980  Peyrot
4,698,474 A *  10/1987 Gugel ................. B23K 9/0286
                                                    219/60 A
6,459,062 B1   10/2002 Guerrina
7,673,784 B2 * 3/2010  Headings ............ B23K 9/0286
                                                    219/60 A

FOREIGN PATENT DOCUMENTS

EP         0581535 A1    2/1994

OTHER PUBLICATIONS

International Application No. PCT/IB2013/000966, International Search Report & Written Opinion, 8 pages, Oct. 18, 2013.

* cited by examiner

*Primary Examiner* — Lee D Wilson
(74) *Attorney, Agent, or Firm* — Perkins Coie LLP

(57) ABSTRACT

Techniques, systems, and devices are described for a weld head that includes an adjustable clamping mechanism with a quick release insert. In one aspect, a weld head having an adjustable clamping mechanism for clamping a welding work piece includes a weld head containment structure having an opening that receives a welding work piece, a clamping member located inside the opening of the weld head containment structure and including a pivot joint for clamping the welding work piece to the weld head, a handle member connected to the clamping member at the pivot joint to rotate the clamping member when the handle member is moved, and an actuator coupled to the clamping member to enable the clamping member to pivot on the pivot joint to different clamping positions for clamping welding work pieces of different sizes.

26 Claims, 8 Drawing Sheets

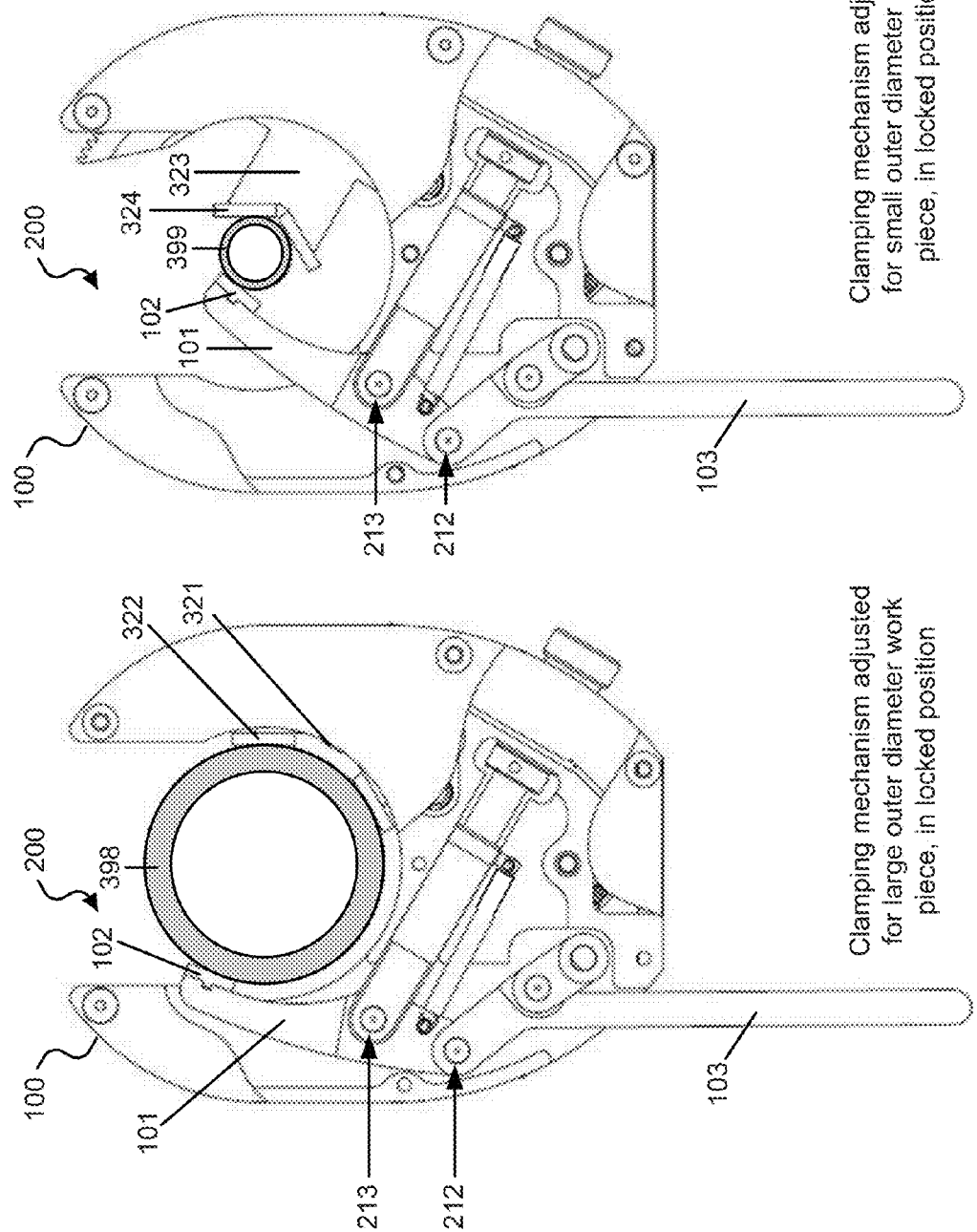

Insert In

Insert Out

ADJUSTABLE CLAMPING MECHANISM OF A WELD HEAD WITH QUICK RELEASE INSERT

BACKGROUND

This patent document relates to welding systems, devices, and processes.

Welding in large industrial applications, e.g., metal inert gas (MIG) and tungsten inert gas (TIG) pipe or plate welding, can involve welding together thick work pieces in an orbital welding process. In orbital welding, a weld head can be mounted onto, and driven by a motor to rotate continuously 360 degrees around, a work piece such as a pipe or be rotated around the pipe for 180 degrees on one side of the pipe and then repeat head rotation on the other side of the pipe. Many welding applications require precision welding, from the small standard work pieces to those of the larger scale. Orbital welding processes can be mechanized and automated, which have advantages over manual welding processes that include repeatability of consistent welds, improved welding quality, reduced operator fatigue, higher production output and lower rejection rates, and reduced difficulty to weld in tight clearances and hard-to-reach locations. For example, an orbital welding process can include a mechanized TIG welding process that joins pipe and tube segments using a clamp-on weld head in which the pipe (or tube) remains stationary and the welding torch can automatically rotate around the weld joint to complete the entire weld. The clamp-on weld head can be fixed concentric to the pipe during welding by a clamping mechanism. The clamping mechanism of the clamp-on weld head can significantly affect the accuracy of the weld. For example, unstable or misaligned attachment of the weld head to the pipe by the clamping mechanism can result in an imprecise weld, which may subsequently lead to premature fatigue, damage, or breakage.

SUMMARY

Exemplary techniques, systems, and devices are described for welding systems that use a weld head incorporating an adjustable clamping mechanism with a quick release insert.

In one aspect of the disclosed technology, a weld head having an adjustable clamping mechanism for clamping a welding work piece is provided to include a weld head containment member structured to include an opening that receives a welding work piece; a clamping member located inside the opening of the weld head containment member and structured to be movable around a pivot point to clamp the welding work piece to the weld head, a handle member connected to the clamping member at the pivot joint to rotate the clamping member when the handle member is moved; and an actuator coupled to the clamping member to enable the clamping member to pivot around the pivot joint to different clamping positions for clamping welding work pieces of different sizes.

In another aspect, a weld head having a releasable insert mechanism for holding a welding work piece includes a weld head containment member structured to include an opening that receives a welding work piece and a cavity in an inner side of the opening, a clamping member located inside the opening of the weld head containment member for clamping the welding work piece to the weld head, an insert component having a first end that fits the cavity and a second end shaped to support the welding work piece against the clamping member, and an attachment mechanism in the cavity that releasably engages the first end of the inert component in the cavity.

In another aspect, a weld head having an adjustable clamping mechanism for engaging a welding work piece includes a weld head containment member structured to include an opening that receives a welding work piece and a cavity in an inner side of the opening, a clamping member located inside the opening of the weld head containment member to clamp the welding work piece to the weld head and structured to pivot around a pivot joint, an insert component having a first end that fits the cavity and a second end shaped to support the welding work piece against the clamping member, an attachment mechanism in the cavity that includes an engagement to releasably engage the first end of the inert component in the cavity, a handle member connected to the clamping member at the pivot joint to rotate the clamping member when the handle member is moved, and an actuator coupled to the clamping member to enable the clamping member to pivot on the pivot joint to different clamping positions for clamping welding work pieces of different sizes.

The subject matter described in this patent document can be implemented in specific ways that provide one or more of the following features. For example, disclosed technology can allow the clamping of a work piece to be easily adjustable and accessible, e.g., by allowing a user to adjust with one hand and clamp with the other. The adjustment of the clamping position of a clamping arm can be implemented such that there is a minimal effect on the clamped location of the handle, e.g., regardless of work piece size, the handle can lock a work piece of any size in the same position. For example, the locking position can facilitate a very high clamping force on a work piece by the clamping arm with much less necessary force to position the handle in the locking position. A clamp plate attached to the clamping arm can provide many options for the contact with the work piece. For example, the clamp plate can be configured to have a long length to provide more axial contact with a work piece. The clamp plate can also be shaped to provide more than one point of contact. For example, the clamp plate can be contoured to a work piece's outer diameter, e.g., providing more surface area of contact and reducing the risk of damaging the work piece.

BRIEF DESCRIPTION OF THE DRAWINGS

FIGS. 3A-3B show cutaway views of the exemplary adjustable clamping mechanism implemented to clamp a work piece.

Like reference symbols and designations in the various drawings indicate like elements.

DETAILED DESCRIPTION

Examples are provided to illustrate various techniques, systems, and devices for welding systems that use a weld head incorporating an adjustable clamping mechanism with a quick release insert.

In one aspect, the disclosed technology can include an adjustable clamping mechanism of a weld head in a welding system, e.g., an orbital welding system in which the weld head orbits around a welding work piece. The adjustable clamping mechanism can be implemented to secure the weld head in place on the welding work piece, e.g., a pipe, tube, or other type work piece. Exemplary weld heads can include hand-held or other portable weld heads.

Figure 1A:
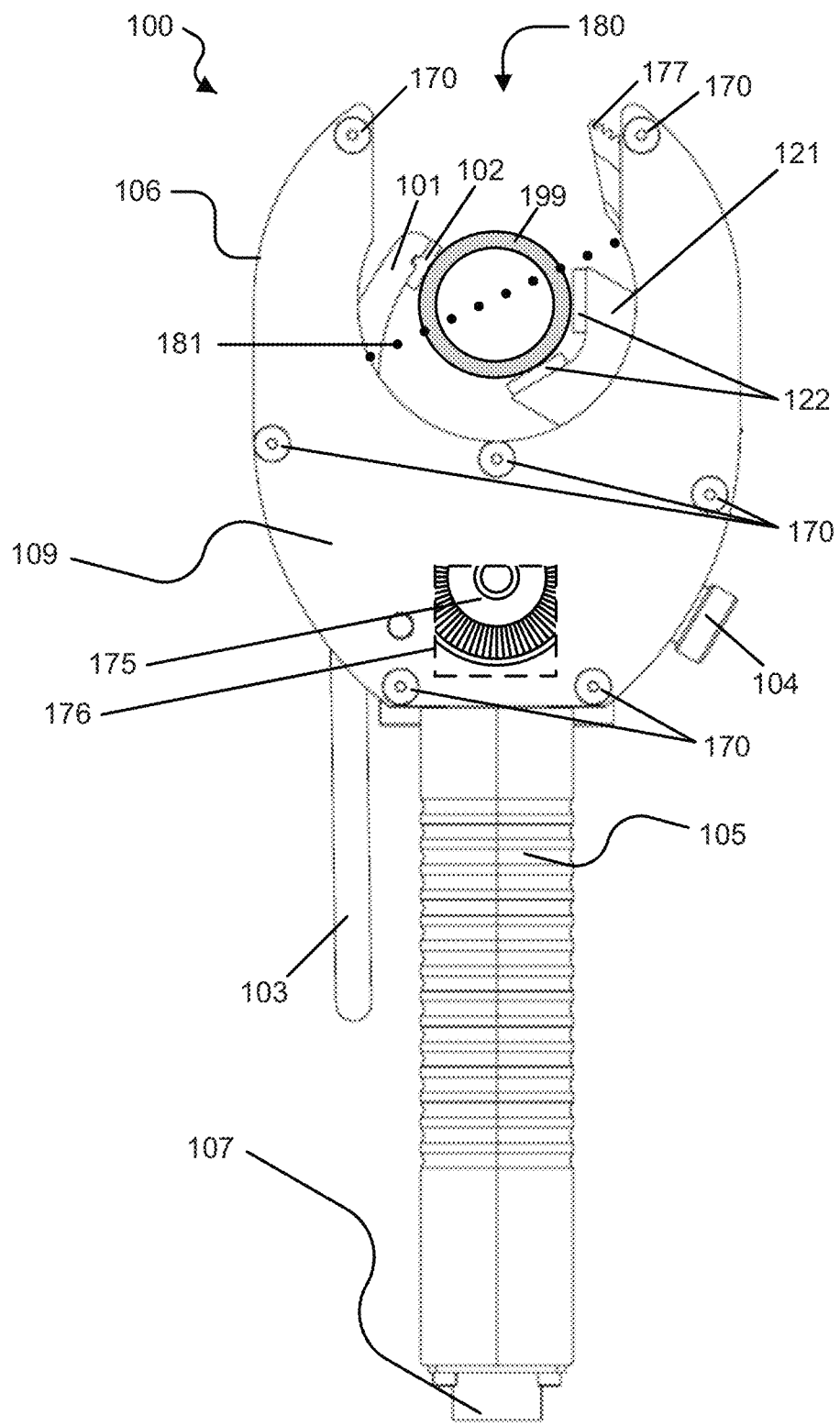
FIGS. 1A-1C show schematics of the exterior of a weld head featuring an exemplary adjustable clamping mechanism.

FIG. 1A shows a two dimensional top view of a schematic of the exterior of an exemplary weld head 100 featuring an adjustable clamping mechanism. The weld head 100 is shown in this example as an open-chamber weld head. In other examples, weld head 100 can be a closed-chamber weld head. The weld head 100 can include precision motors and engagement gears (e.g., heavy duty gears with double bearings), which can be encased within a weld head containment member 106, also referred to as a weld head body or a housing component. The weld head 100 includes a cover panel 109 that covers the mechanisms encased within the weld head containment member 106. For example, the cover panel 109 can be a sheet metal panel that can be attached and detached by screws or bolts 170. The weld head 100 includes a drive gear 175 (shown in the cutaway block 176) that can enable the weld head 100 to be rotated around the work piece in an orbital welding process, e.g., in an engaged position. The weld head 100 includes a switching latch 408 (shown later in FIG. 4A), which can be used to disengage the drive gear 175, e.g., enabling the gearing to turn freely. The weld head containment member 106 can accommodate for an arc tip that generates the arc for welding, an inert gas feed, and weld wire feeder. These exemplary welding components can be configured on the other side of the weld head 100 (e.g., the perspective of the weld head 100 shown in FIG. 4A) via a ring gear 177. The weld head 100 includes a main weld head handle 105 that provides a grip area for a welding operator. The weld head handle 105 can be detachable from the containment member 106, e.g., by removing bolts 171 (shown later in FIG. 1C). An interface component 107 is connected to the external end of the weld head handle 105, which enables an electrical connection between the weld head 100 and a welding control unit that supplies power to and controls the weld head 100. For example, the interface component 107 can provide a means to facilitate power, control and data transfer to and/or from the weld head 100 and the welding control unit.

As shown in FIG. 1A, the weld head containment member 106 is structured to include a work piece holding part that has an opening 180 to enable the engagement of the weld head 100 around a work piece 199. For example, the work piece 199 can be in various configurations, including, e.g., a pipe, tube, other cylindrical work piece, or other non-cylindrical work piece. The work piece holding part includes an adjustable clamping mechanism within the opening 180 to receive and hold work pieces of different dimensions so that the weld head 100 can be adaptable to a wide variety of weld joints. For example, the weld head 100 is configured to hold work pieces of varying dimensions or diameters up to a maximum diameter 181 which is shown by the dotted line across the engagement region and is dictated by the configuration of the opening 180 and the clamping mechanism therein.

FIG. 1A shows some details of the clamping mechanism of the weld head 100 by an exemplary adjustable clamping mechanism of the disclosed technology. In this example, the adjustable clamping mechanism includes a clamping arm 101 and a clamping plate 102 at or near the distal end of the arm 101, located within the opening 180. The clamping arm 101 and clamping plate 102 can move around to change or adjust their position to clamp down the work piece against the inner side of the opening 180. For example, the clamping plate 102 is configured on the clamping arm 101 such that it can make contact with the work piece 199. The work piece 199 can be secured between the clamping arm 101 in this mechanism and some other fixed or adjustable linkage and surface, e.g., an insert 121 and a contact pad 122. In some examples, the insert 121 and the contact pad 122 can be a quick release (attachable/detachable) insert unit. In other examples, the weld head 100 can include an insert 121 and a contact pad 122 that are configured in a fixed position; or for example, the contact pad 122 can be configured directly to the containment member 106 without the insert 121. The exemplary contact pad 122 can provide clamping support on one side of the work piece 199 while some other member of the exemplary adjustable clamping mechanism supplies the clamping force on the other, e.g., clamping plate 102. The exemplary adjustable clamping mechanism can provide at least one point of contact and clamping force on the work piece 199, e.g., at the interface between the clamping plate 102 and the work piece 199.

The clamping arm 101 can be connected to a clamping handle 103, e.g., which is shown in a locked position, extending along side the weld head handle 105. An adjustment knob 104 is configured on the opposite side of the weld head 100 from the clamping handle 103. The adjustment knob 104 can provide access for a user to adjust the position of the clamping arm 101 to provide contact and force concentric to a work piece. For example, when clamping handle 103 is in the locked position (as shown in FIG. 1A), the adjustment knob 104 can be rotated in a direction to move the clamping arm 101 toward the work piece 199, e.g., as a tightening utility. Alternatively, for example, the adjustment knob 104 can be rotated in the opposite direction to move the adjustment knob 104 away from the work piece 199, e.g., as a loosening utility. The adjustment knob 104 can have a knurled end to be turned by hand, or it can have a knob or recess or slot, e.g., to be turned with a tool. In other examples, the adjustment knob 104 can be a button or other configuration to translationally move such that the adjustment arm 104 tightens or loosens around the work piece 199.

Figure 1B:
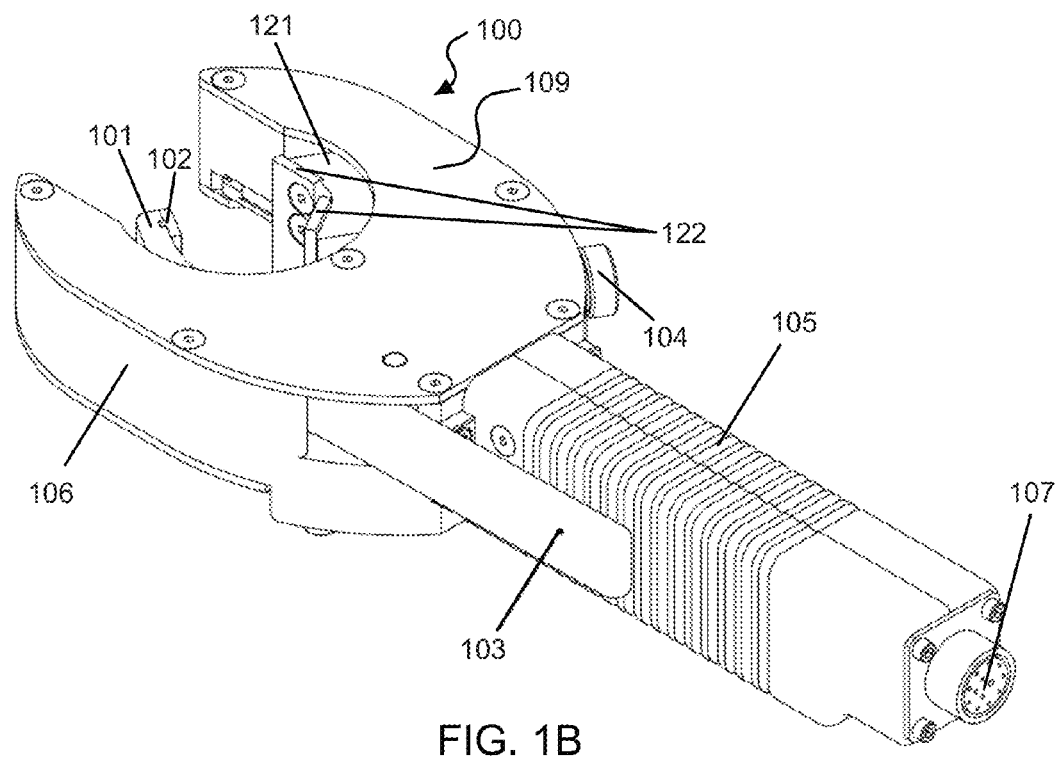
Figure 1C:
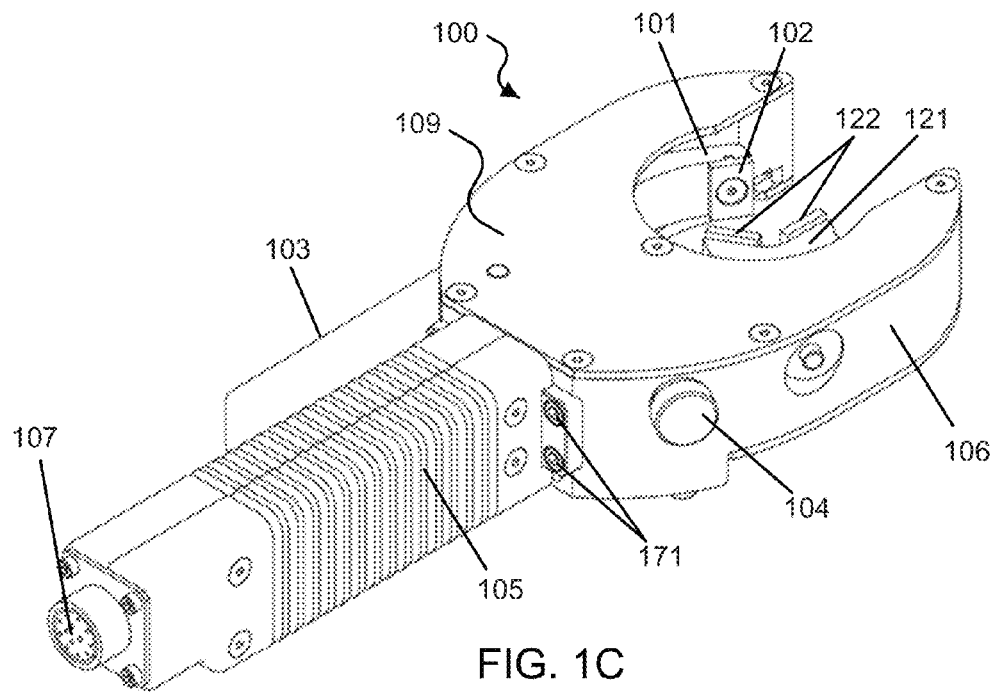

FIGS. 1B and 1C show various three dimensional views of the weld head 100 including the disclosed adjustable clamping mechanism. FIG. 1B shows the surface of the exemplary contact pad 122, which can be interchangeable with another contact pad, e.g., of any desired shape, contour, or length. FIG. 1C shows the surface of the exemplary clamping plate 102, which can be made to any desired shape, contour, or length. For example, various clamp plates can be used and interchanged for various contact options.

Figures 2A, 2B:
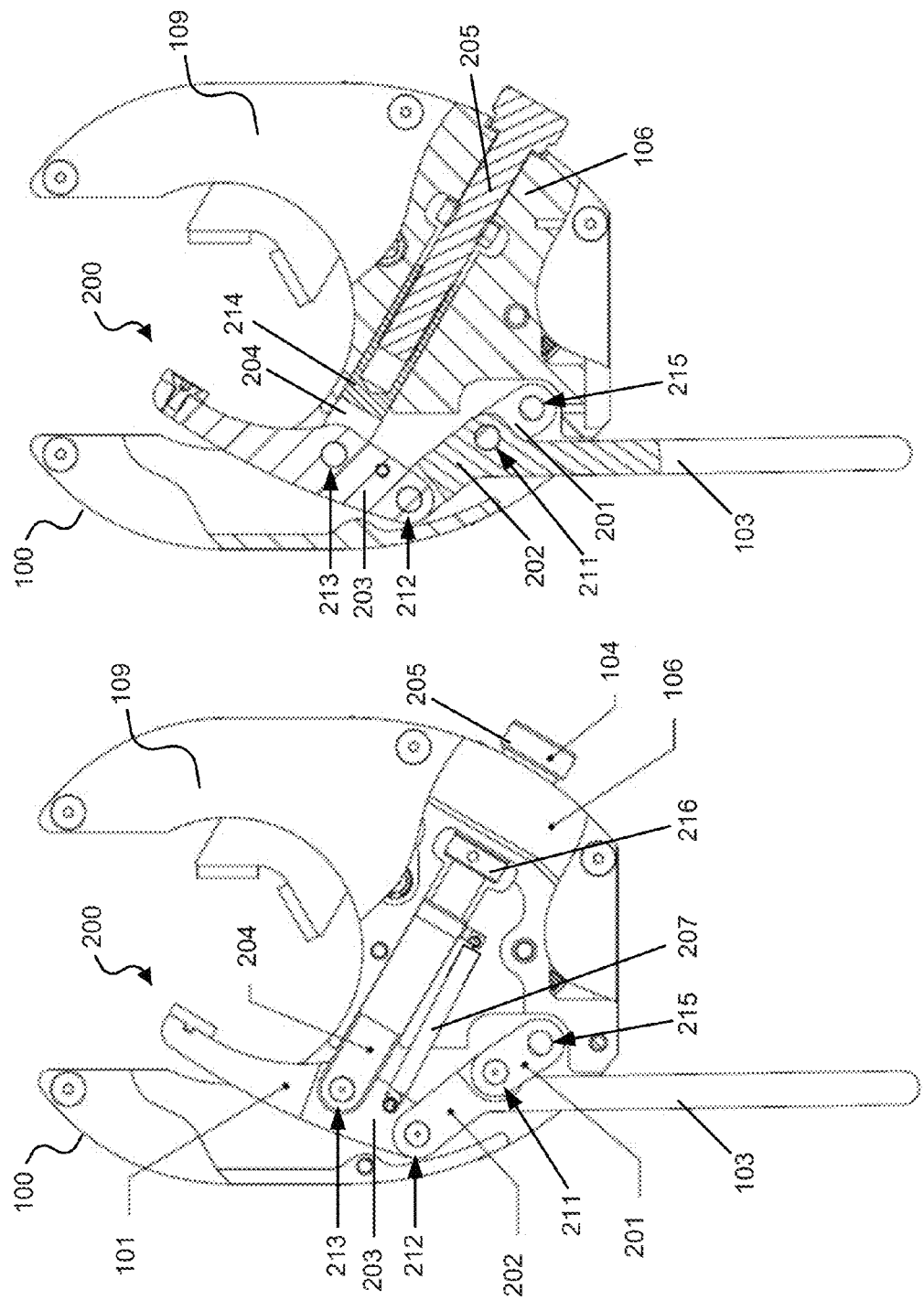
FIGS. 2A-2B show cutaway views of the exemplary adjustable clamping mechanism in the weld head.

FIG. 2A shows an example of a two dimensional cutaway view of an adjustable clamping mechanism 200 which can be implemented in the exemplary weld head 100. In the illustrated example, the adjustable clamping mechanism 200 includes six components (e.g., 201, 202, 203, 204, 205, and 106). For example, the components 201, 202, 203, 204, 205, and 106 can be made of a material of a sufficient strength for to handle an applied clamping force, such as steel and other metal materials, or composite materials. In some configurations, for example, the containment member component 106 can be made of aluminum, e.g., which can provide reduced weight and greater machinability. In this example, the component 201 is connected to the component 202 at a joint 211.

The component 201 can have one pivot point attached to the component 202 at the joint 211 and a fixed pivot point attached to the weld head 100, e.g., joint 215 attached to the structure of containment member 106. In other examples, the component 201 can be included as part of the structure of containment member 106 of the weld head 100. The component 202 is connected to the component 203 at a joint 212. The component 202, which also can include the clamping handle 103, can create a link between the component 201 and the component 203 by using the joints 211 and 212. The component 203 is connected to the component 202 and the component 204 and can include the clamping arm 101. The component 204 can be a sliding piece that is configured in a position having a pivot point at a joint 213 in connection with the component 203. The component 205 is an actuator that can be implemented to move the clamping arm 101. For example, the actuator component 205 can be a screw that is free to rotate within the component 204, but held in place relative to the housing component 106. The external region of the exemplary screw-like actuator component 205 can include the adjustment knob 104. For example, the component 204 is connected to the exemplary screw-like actuator component 205 by a threading connection 214. The exemplary screw-like actuator component 205 is held in place by a shaft collar 216, retaining it in the housing component 106 so that the actuator component 205 is free to rotate, but not move axially. For example, since the actuator component 205 is held axially in place within the housing component 106, rotating the exemplary screw-like actuator component 205 results in linear translation of the component 204, e.g., a sliding motion.

Figure 2C:
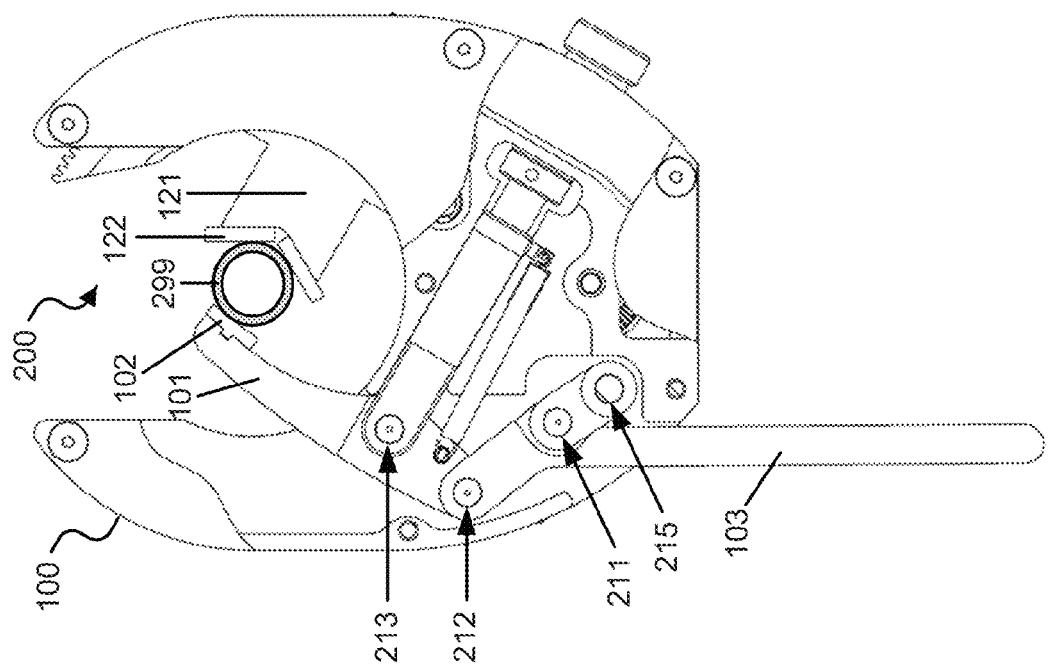
FIGS. 2C-2D show cutaway views of the exemplary adjustable clamping mechanism in an unclamped and clamped position.

The adjustable clamping mechanism 200 can also have a tension spring 207 between a spot on the component 203 and the sliding component 204. The exemplary spring 207 can serve multiple functions. For example, as shown in FIG. 2A, even if the clamping arm 101 is not clamped on a work piece, when the clamping handle 103 is moved to a locked position, the spring 207 can hold the adjustable clamping mechanism 200 in the locked position. For example, the locked position can include the components 201 and 202 oriented in-line (e.g., at a 180 degree angle) or over-center (e.g., past a 180 degree angle). For example, the in-line or over-center configurations of the components 201 and 202 can enable a clamping load to apply a force to rotate the angle further past 180 degree angle (e.g., rather than force the clamp to an open position). The housing component 106 and/or the components 201 and 202 can further include a step or a link feature that provides further support to prevent further rotation and keep the adjustable clamping mechanism 200 locked in place. For example, the exemplary step or link can provide a contact from the component 201 to the housing component 106 when the link reaches a particular angle (e.g., a 185 degree angle) to prevent further rotation. An open position can include the components 201 and 202 oriented at an angle less than that of in-line (e.g., a near perpendicular angle as shown in FIG. 2C). For example, when opening the adjustable clamping mechanism 200 to the open position (e.g., by rotating the clamping handle 103 away from the weld head handle 105), the spring 207 can assist in opening the clamping arm 101 away from the work piece.

FIG. 2B shows another cutaway view of the exemplary adjustable clamping mechanism 200 showing the actuator component 205 as a screw that threads into the threading connection 214 of the component 204. The adjustment knob 104 region of the exemplary actuator component 205 can protrude outside of the housing component 106 to provide access for a user to adjust the position of the clamping arm 101. For example, when the adjustable clamping mechanism 200 is in the locked position, e.g., the components 201 and 202 are locked over-center (e.g., align in a substantially 180 degree angle), turning the exemplary screw-like actuator component 204 can cause the component 205 to slide such that it moves the pivot point 213 of the clamping arm 101 (e.g., driving the component 203 away and toward a work piece in the clamping mechanism). In this example, component 205 actuates the component 204 to move the component 203 away from or toward a work piece by pivoting at joint 212. This can adjust the clamped position of the component 203 to accommodate different sizes of work pieces (e.g., pipes of different outer diameters). For example, the actuator component 205 can be screwed into the thread connection 214 of the component 204 (e.g., passing through the housing component 106 and held in place by the shaft collar 216), such that by turning the screw-like actuator component 205, the component 204 can slide in a translational motion. For example, by turning the actuator component 205 in one direction, the component 204 can slide forward and drive the component 203 away from a work piece to be clamped, e.g., to precisely engage a relatively larger outer diameter work piece. Also for example, by turning the actuator component 205 in the other direction, the component 204 can slide backward and drive the component 203 toward a work piece to be clamped, e.g., to precisely engage a relatively smaller outer diameter work piece.

Figure 2D:
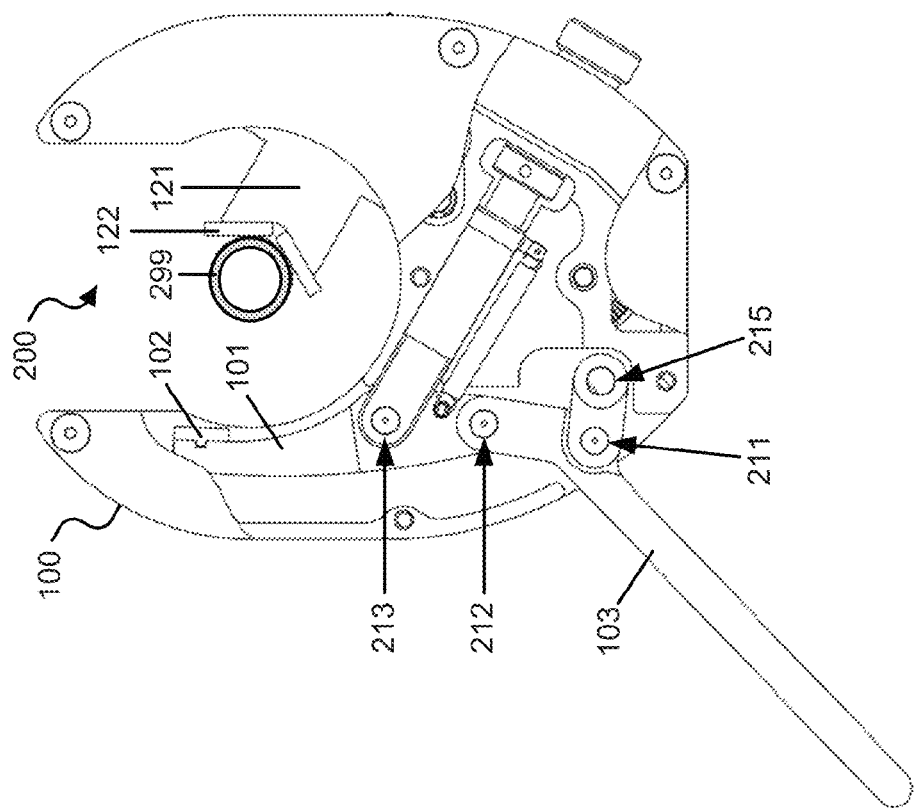

FIGS. 2C and 2D show exemplary cutaway schematics featuring two positions of the clamping arm 101 and the clamping handle 103 in an open position (FIG. 2C) and a clamped position (FIG. 2D). For example, the clamping handle 103 region of the component 202 can be moved to drive the component 203 to set the position of the clamping arm 101. For example, FIG. 2C shows that when the clamping handle 103 is moved to an 'open' position, the clamping arm 101 can move away from an exemplary work piece, e.g., swing away from a pipe 299 resting on the contact pad 122 of the insert 121. Also for example, FIG. 2D shows that when the clamping handle 103 is moved to a 'locked' position, the clamping arm 101 can move towards an exemplary work piece, e.g., swing towards from the pipe 299. In this instance, the rotation between the components 201 and 202 can be configured to be restricted such that they can move to a position slightly over-center or form a substantially 180 degree angle. This exemplary restricted rotation between the components 201 and 202 can cause the adjustable clamping mechanism 200 to lock in place when clamped on the pipe 299.

FIGS. 3A and 3B show exemplary cutaway schematics featuring a clamped or locked position of the clamping mechanism 200 of the weld head 100 concentric to work pieces of different outer diameters, e.g., in which the clamping handle 103 is positioned in the same locked position. For example, FIG. 3A shows the clamping handle 103 positioned in the locked position and the clamping arm 101 clamped to a large work piece 398 (with a large outer diameter) resting on a contact pad 322 of an insert piece 321. As shown in FIG. 3A, the clamping arm 101 can be positioned at a greater distance from the complimentary insert piece 321 to accommodate the larger work piece 398, e.g., by adjusting the position of the component 203 via the components 204 and 205 using the adjustment knob 104, as previously described. FIG. 3B shows the clamping handle 103 positioned in the locked position and the clamping arm 101 clamped to a small work piece 399 (with a smaller outer diameter than the work piece 398) resting on a contact pad 324 of an insert piece 323. As shown in FIG. 3B, the clamping arm 101 can be positioned at a lesser distance from the complimentary insert piece 321 to accommodate the smaller work piece 399, e.g., by adjusting the position of the component 203 via the components 204 and 205 using the adjustment knob 104, as previously described. Also for example, to accommodate the larger work piece 398 (in FIG. 3A) or the smaller work piece 399 (in FIG. 3B), the insert pad 322 and insert piece 321 can be configured to various angles, separations, shapes, contours, and other design parameters. For example, the insert piece 321 can be held in place by a secure mechanism incorporated within the body of weld head 100 (e.g., the containment member 106). For example, the secure mechanism can include a releasing mechanism such as a quick release pin fixed to the body of weld head 100 that can be inserted through a hole in the insert piece 321, as described later in the patent document.

In another example for implementing the adjustable clamping mechanism 200, the clamping handle 103 can be included as part of the component 201 rather than the component 202. In this exemplary configuration, the user can rotate the clamping handle 103 in the opposite direction to lock or open the clamping mechanism 200.

In another example of the adjustable clamping mechanism 200, the joint 212 can be configured as a fixed pivot point such that the clamping arm 101 can be used to clamp and unclamp a work piece. In this example, the actuator component 205 can be implemented to move the sliding component 204, which pivots the component 203 about the joint 212, which can result in clamping and unclamping of the weld head to/from a work piece, in addition to providing adjustable clamping functionality. In this example, the components 201 and 202 can be excluded from the adjustable clamping mechanism 200.

The disclosed adjustable clamping mechanism can be configured such that the adjustment knob 104 is on the opposite side of the weld head 100 as the clamping handle 103. This exemplary configuration can allow the clamping arm position (e.g., the position of the clamping arm 101) to be easily adjustable and accessible, for example, by allowing a user to adjust with one hand and clamp with the other. In examples in which the direction of travel of the sliding component 204 is nearly perpendicular to the component 203, the adjustment of the clamping position of the clamping arm 101 has little impact on the clamped location of the handle. As such, the clamping handle 103 can lock to the same position for clamping work pieces of different dimensions. For example, the use of a clamping plate attached to the clamping arm gives many options for the contact with the work piece. The exemplary clamping plate 102 can be configured to have a long length to provide more axial contact with a work piece. The clamping plate 102 can also be shaped to provide more than one point of contact. For example, the clamping plate 102 can also be configured to be contoured to the exemplary work piece's outer diameter, e.g., to provide more surface area of contact and reduce risk of denting the work piece. The locking position at the joint 211, which can position the components 201 and 202 at an over-center position, can provide a substantial mechanical advantage when transmitting force from the handle to the clamping arm. For example, the locking position at the joint 211 can exert a high clamping force on a work piece by the clamping arm 101 with a relatively small amount of force to close the handle (e.g., position the clamping handle 103 in the locked position).

In another aspect, the disclosed technology can include a quick release insert of a weld head clamping mechanism that can provide a fixed interface for a work piece to contact against during clamping by the weld head. FIG. 4A shows a two dimensional view of a schematic of the exterior of the exemplary weld head 100 including a quick release insert mechanism 400. The exemplary releasable insert mechanism 400 can include an insert component 421 and one or more contact pads 422. The exemplary releasable insert mechanism 400 shown in FIG. 4A is configured to provide at least two points of contact and force on a work piece 499, e.g., which can be implemented in an orbital welding system in which weld head 100 is secured to the work piece 499. The releasable insert mechanism 400 can also be configured to provide one point of contact and force on the work piece 499, e.g., by including the insert component 421 and one contact pad 422. The exemplary insert component 421 is attached to the containment member 106 of the weld head 100. The exemplary one or more contact pads 422 attached to the insert component 421 can provide clamping support on one side of the work piece 499 while some other member of the weld head 100's clamping mechanism (e.g., adjustable clamping mechanism 200) supplies the clamping force on the other, e.g., clamping plate 102. The releasable insert mechanism 400 can also include a securement means to hold the insert component 421 in place with respect to the body of weld head 100. Also shown in the exemplary view in FIG. 4A is the switching latch 408, which can be used to disengage the drive gear, e.g., enabling the gearing to turn freely around the clamped work piece 499. The weld head handle 105 can be detached from the weld head 100, e.g., by removing bolts 171 (previously shown in FIG. 1C), and is not shown in FIG. 4A.

Figure 4B:
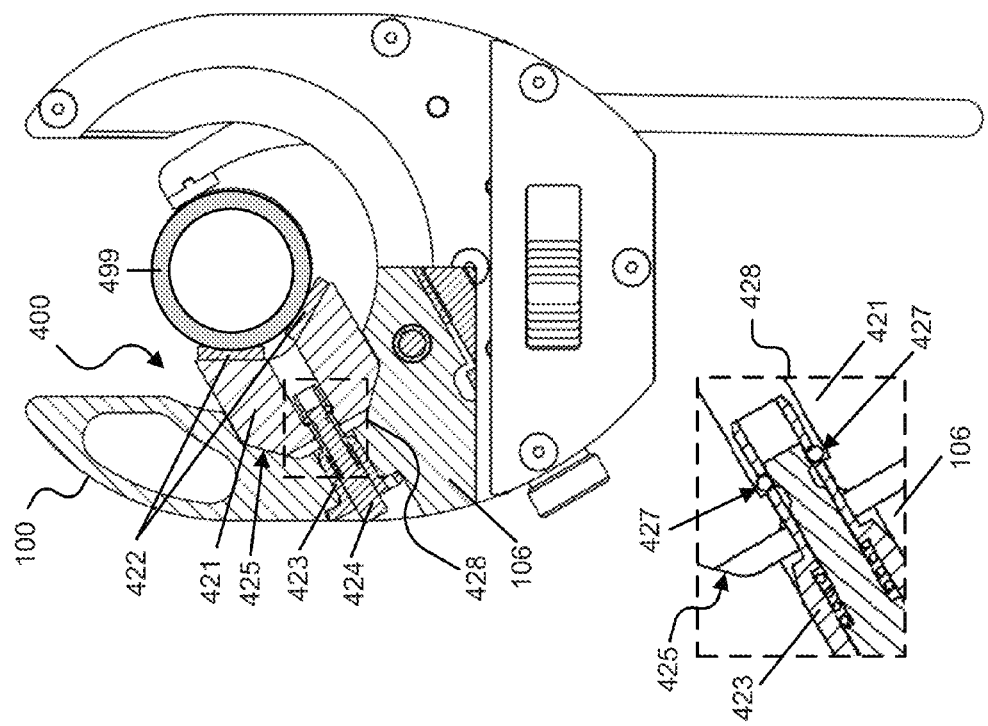
FIG. 4B shows a cutaway view of the exemplary quick release insert mechanism.
Figure 4A:
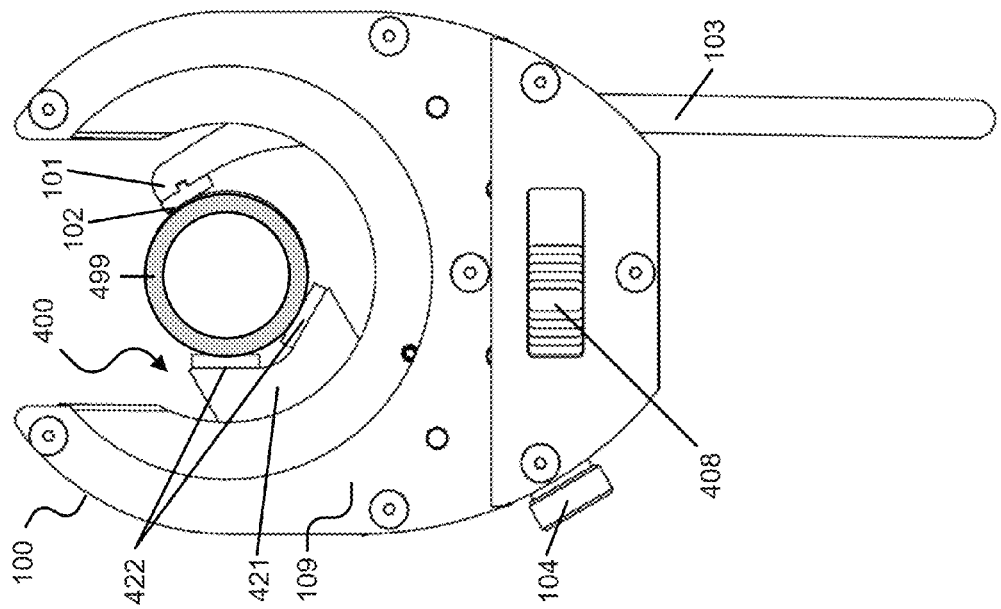
FIG. 4A shows a schematic of the exterior of a weld head including an exemplary quick release insert mechanism.

FIG. 4B shows an exemplary cutaway view of the weld head 100 including the releasable insert mechanism 400. The exemplary releasable insert mechanism 400 can include a quick release pin 423 having a button 424 that can be pressed to secure and/or remove the insert component 421. For example, a view box 428 shows a cutaway view of the quick release pin 423, which shows that the quick release pin 423 can include balls 427 (e.g., two or four balls) that protrude out the side of the shaft near the external region of the release pin 423. The exemplary balls 427 can secure the insert component 421. For example, pressing the button 424 can allow the balls 427 to retract into the shaft, thereby allowing the insert component 421 to slide on or off of the release pin 423. In some examples, the quick release pin 423 can include another means to secure the insert component 421, e.g., the balls 427 can be configured as an angled piece such as a pawl. The insert component 421 can be configured to a shape such it provides a self-alignment within the body of weld head 100. For example, the insert component 421 can include an angled surface 425 that aligns in a substantially precise manner with the surface of the body of the weld head 100. For example, the angled surface 425 can include multiple surfaces (e.g., two surfaces) forming a taper that guides the insert component 421 into place. An exemplary function of the quick release pin 423 can include holding the insert component 421 in place within the weld head 100 such that the weld head 100 can rest on a work piece while unclamped to the work piece 499, e.g., work piece 499 makes contact with the one or more contact pads 422. For example, once a clamping force is applied, the load from a clamped work piece can press the insert component 421 directly against the body of weld head 100, and the body can take the load.

Figure 4C:
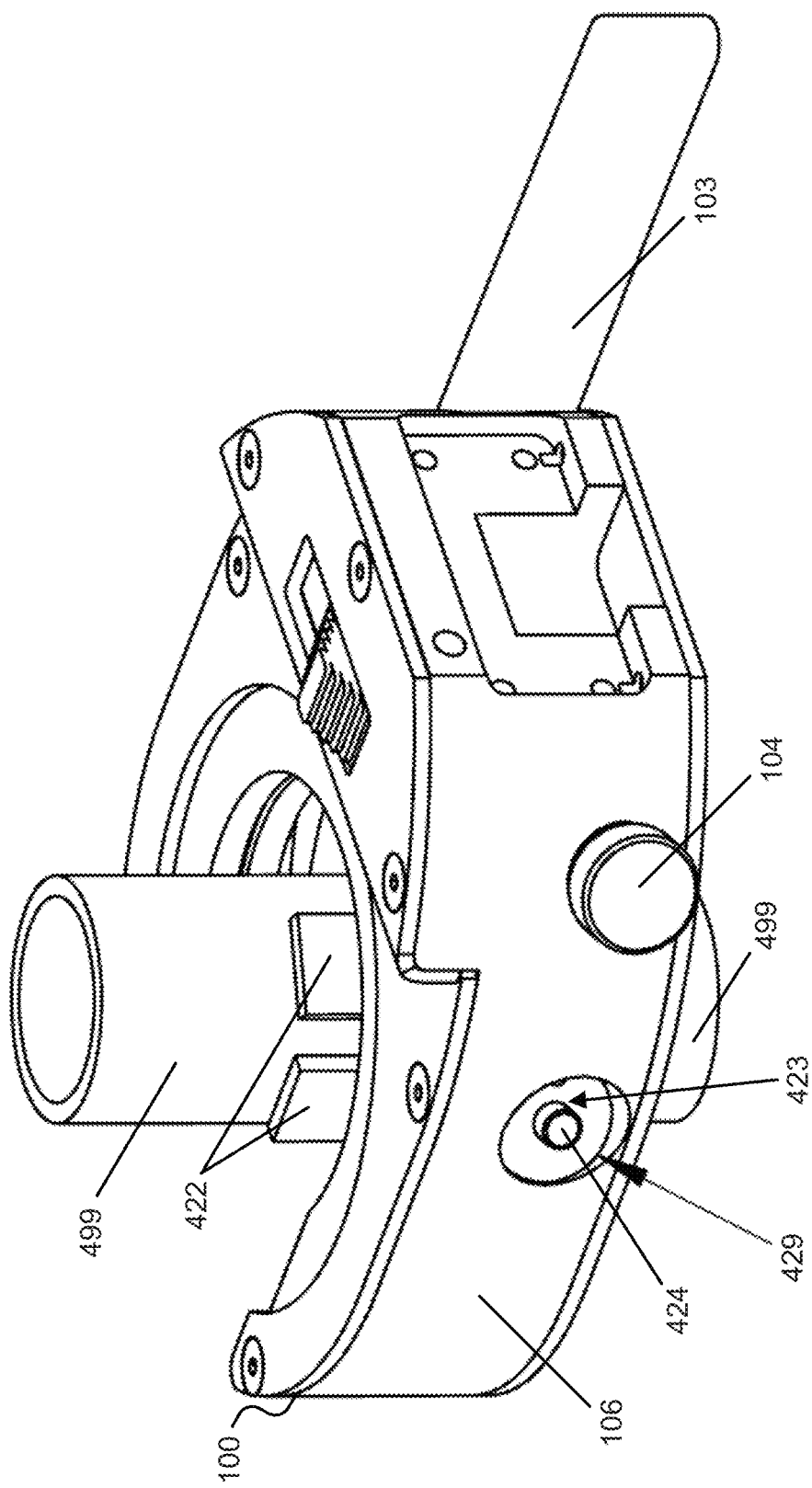
FIG. 4C shows a schematic of the weld head including the exemplary quick release insert mechanism with a release pin.

FIG. 4C shows a three dimensional schematic view of the exterior of weld head 100 that includes the quick release insert mechanism 400 with the release pin 423 with the button 424. The figure shows the button 424 protruding outward from a recessed region 429 in which the pin 423 is contained. The button 424 of the quick release pin 423 can be contained within the recessed region 429, for example, to prevent incidental depression of the button for unintended release of the insert component 421.

Figure 5A:
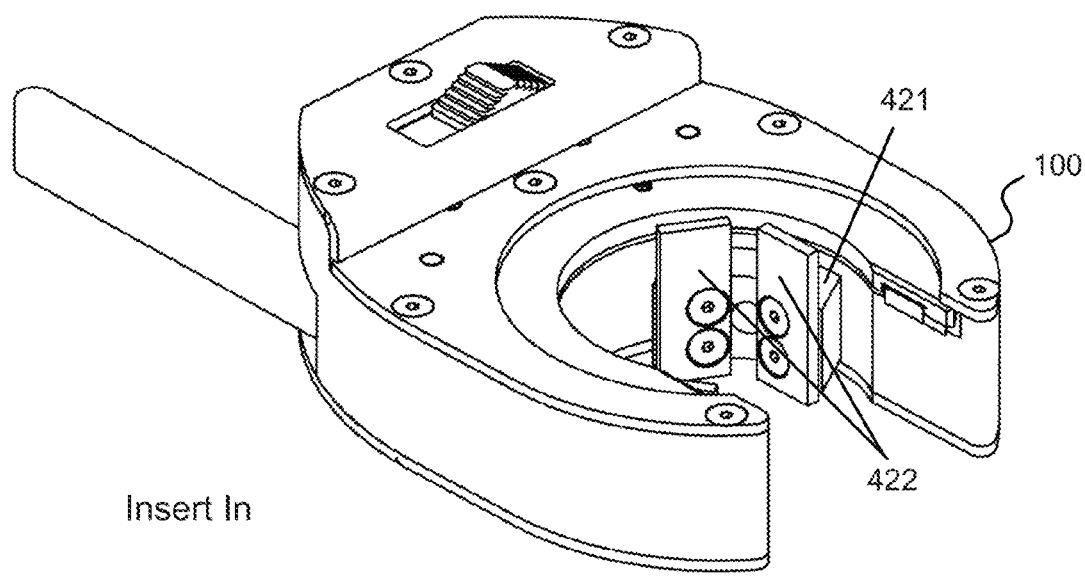
FIGS. 5A-5B show schematics of the exemplary quick release insert mechanism with the insert component secured to and released from the weld head.
Figure 5B:
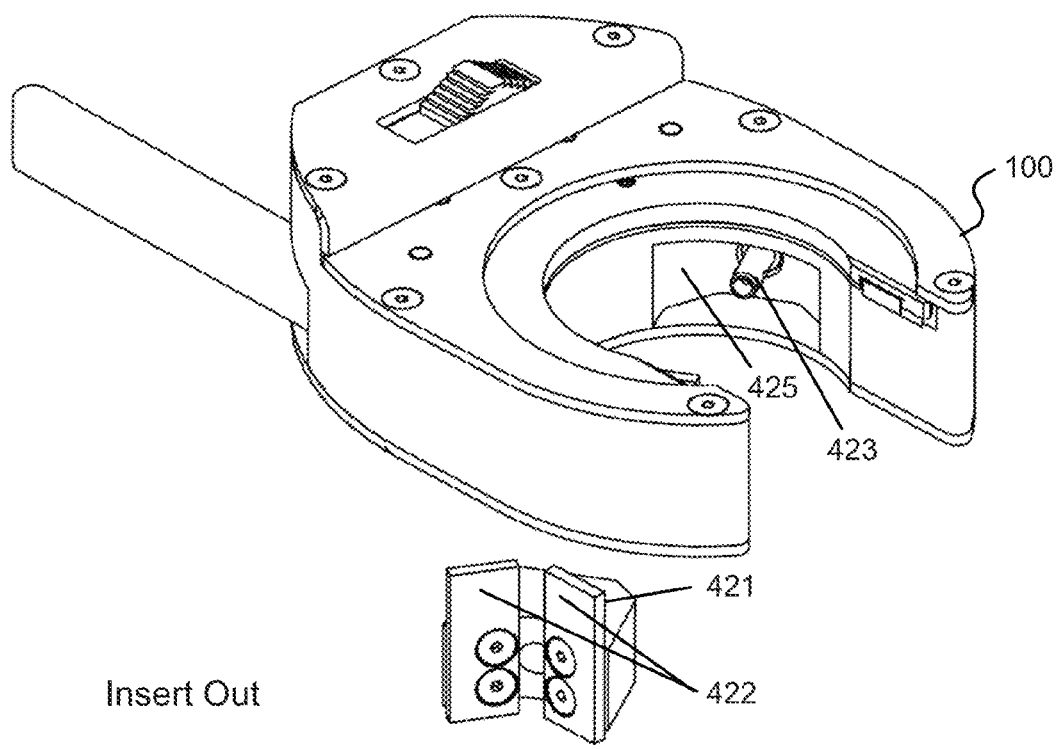

FIGS. 5A-5B show exemplary three dimensional views of schematics featuring the disclosed insert secured in and released from the weld head 100. For example, FIG. 5A shows the disclosed insert (e.g., insert component 421 and contact pad(s) 422) positioned in the inserted position (e.g., insert in). FIG. 5B shows the disclosed insert positioned in the released position (e.g. insert out). The schematic in FIG. 5B also shows a terminal end of the release pin 423 protruding out of a cavity of the weld head 100 that can be configured to align with the insert component 421 at the angled surface 425 that matches its geometry.

This disclosed insert mechanism can be included as part of the disclosed adjustable clamping mechanism in an orbital weld head system, e.g. which can hold the weld head securely in place on the pipe. The disclosed insert mechanism can include the following features and provide the following advantages. The disclosed inserts (e.g., insert component 421 and contact pad(s) 422) can be made in many different styles depending on a user's needs. For example, a user may carry many different types of inserts in the field and switch them out as needed. For example, the disclosed inserts can be marked or color coded indicating the corresponding pipe size so that the user can easily identify which configuration of the disclosed inserts is to be used on the work piece. Also, multiple secure/release means can be employed in the releasable insert mechanism 400. For example, the insert component 421 can also be held in place by a spring loaded ball detent pin, e.g., which can involve forcing the insert in and out to overcome the ball detent force. Or, for example, the insert component 421 can also be held in place by a regular bolt.

For example, each insert (e.g., insert component 421 and contact pad(s) 422) can be designed for a specific size work piece, e.g., providing perfect concentricity of the weld head about the work piece without any need for positional adjustment. The shape of the disclosed releasable insert and the pocket in which it sits can be designed to automatically locate the insert in the proper place once clamping load is applied. The disclosed inserts can be configured for special clamping contact requirements. For example, the disclosed inserts can be made with extra long contact plates to provide better perpendicularity between a weld head and work piece; or the disclosed inserts can be made with a contoured clamping surface that matches the work piece to prevent dents; or the disclosed inserts can be made to accommodate non-round or non-cylindrical pipes. These exemplary inserts can be switched out easily as desired or as space permits. For example, the disclosed inserts can be retained by a quick release pin, and installation and removal of the disclosed inserts can be easily performed and accomplished with the push of a button. For example, installation, adjustment, replacement, and/or removal of the disclosed inserts can be performed without using tools. The disclosed inserts can transmit a clamping load directly through the insert into the main body of the weld head, thus enabling an orbital weld head system to be very strong and withstand very high clamping forces, allowing a very rigid connection to the pipe.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is:

1. A weld head that supports a welding work piece, comprising:
    a weld head containment member structured to include an opening that receives a welding work piece;
    a clamping member located inside the opening of the weld head containment member and structured to be movable around a pivot joint to clamp the welding work piece to the weld head;
    a handle member connected to the clamping member to rotate the clamping member at the pivot joint when the handle member is moved; and
    an actuator coupled to the clamping member to enable the clamping member to pivot around the pivot joint to different clamping positions for clamping welding work pieces of different sizes,
    wherein the actuator is coupled to the clamping member by a sliding member that is connected between the actuator and the pivot joint.

2. The weld head of claim 1, wherein the actuator sets a clamping position of the clamping member by moving the sliding member in an axial direction to cause the clamping member to incrementally rotate about the pivot joint.

3. A weld head that supports a welding work piece, comprising:
    a weld head containment member structured to include an opening that receives a welding work piece;
    a clamping member located inside the opening of the weld head containment member and structured to be movable around a pivot joint to clamp the welding work piece to the weld head;
    a handle member connected to the clamping member to rotate the clamping member at the pivot joint when the handle member is moved; and
    an actuator coupled to the clamping member to enable the clamping member to pivot around the pivot joint to different clamping positions for clamping welding work pieces of different sizes,
    wherein the actuator is configured as a screw.

4. The weld head of claim 1, wherein the sliding member includes a threaded cavity to connect the actuator configured as the screw.

5. The weld head of claim 1, further comprising a tension spring connecting the clamping member and the sliding member.

6. The weld head of claim 1, wherein the handle member enables the clamping member to rotate in a clamping direction to a clamped position when the handle member is moved toward a first position and enables the clamping member to rotate in an unclamping direction to an unclamped position when the handle member is moved toward a second position.

7. The weld head of claim 1, wherein the actuator is secured to the weld head containment member.

8. The weld head of claim 1, further comprising a knob at an external end of the actuator configured with a knurled surface to be turned by hand.

9. The weld head of claim 1, further comprising at least one of a knob, recess, or slot at an external end of the actuator configured to be turned by a tool.

10. The weld head of claim 1, wherein the handle member is connected at a joint to an anchor component that is fixed to the weld head containment member.

11. The weld head of claim 1, wherein the clamping member includes a clamping pad to provide a contact region to the welding work piece.

12. The weld head of claim 11, wherein the clamping pad includes a contoured surface.

13. The weld head of claim 11, wherein the clamping pad is interchangeable.

14. The weld head of claim 1, wherein the welding work piece includes at least one of a pipe, a tube, a cylindrically-shaped work piece, a conically-shaped work piece, or a rectangular-shaped work piece.

15. A weld head that supports a welding work piece, comprising:
a weld head containment member structured to include an opening that receives a welding work piece and a cavity in an inner side of the opening;
a clamping member located inside the opening of the weld head containment member and structured to be movable in order to clamp the welding work piece to the weld head;
an insert component having a first end that fits the cavity and a second end shaped to support the welding work piece against the clamping member; and
an attachment mechanism in the cavity that includes a quick release mechanism to detach the first end of the inert component in the cavity to remove the insert.

16. The weld head of claim 15, wherein the first end of the insert component has angled surface configured to align the insert component with a complimentary angled surface of the weld head containment member within the cavity.

17. The weld head of claim 15, wherein the insert component is configured to be of a particular length extending out of the cavity when attached to the weld head.

18. The weld head of claim 15, wherein the insert component is interchangeable with another insert component.

19. The weld head of claim 15, wherein the insert component includes at least one contact pad to make contact with the welding work piece.

20. The weld head of claim 19, wherein the at least one contact pad is interchangeable with other contact pads.

21. The weld head of claim 15, wherein the attachment mechanism includes a pin that enables attachment and detachment of the insert component to the weld head.

22. A weld head that supports a welding work piece, comprising:
a weld head containment member structured to include an opening that receives a welding work piece and a cavity in an inner side of the opening;
a clamping member located inside the opening of the weld head containment member for clamping the welding work piece to the weld head;
an insert component having a first end that fits the cavity and a second end shaped to support the welding work piece against the clamping member; and
an attachment mechanism in the cavity that releasably engages the first end of the inert component in the cavity, wherein the attachment mechanism includes a in that enables attachment and detachment of the insert component to the weld head, and
wherein the pin includes a button that enables detachment of the insert component from the weld head when pressed.

23. The weld head of claim 22, wherein the button is contained within a recessed cavity of the weld head containment member.

24. The weld head of claim 21, wherein the pin is a spring-loaded ball detent pin.

25. A weld head that supports a welding work piece, comprising:
a weld head containment member structured to include an opening that receives a welding work piece and a cavity in an inner side of the opening;
a clamping member located inside the opening of the weld head containment member to clamp the welding work piece to the weld head, the clamping member structured to pivot around a pivot joint;
an insert component having a first end that fits the cavity and a second end shaped to support the welding work piece against the clamping member;
an attachment mechanism in the cavity that includes a quick release mechanism to detach the first end of the inert component in the cavity to remove the insert;
a handle member connected to the clamping member to rotate the clamping member at the pivot joint when the handle member is moved; and
an actuator coupled to the clamping member to enable the clamping member to pivot around the pivot joint to different clamping positions for clamping welding work pieces of different sizes.

26. A weld head that supports a welding work piece, comprising:
a weld head containment member structured to include an opening that receives a welding work piece and a cavity in an inner side of the opening;
a clamping member located inside the opening of the weld head containment member to clamp the welding work piece to the weld head, the clamping member structured to pivot around a pivot joint;
an insert component having a first end that fits the cavity and a second end shaped to support the welding work piece against the clamping member;
an attachment mechanism in the cavity that includes an engagement to releasably engage the first end of the inert component in the cavity;
a handle member connected to the clamping member to rotate the clamping member at the pivot joint when the handle member is moved; and
an actuator coupled to the clamping member to enable the clamping member to pivot around the pivot joint to different clamping positions for clamping welding work pieces of different sizes,
wherein the engagement includes a pin that enables attachment of the insert component to the weld head and a button that enables detachment of the insert component from the weld head when pressed.

* * * * *